April 12, 1949.   N. B. BACH   2,467,003
CLARIFIER
Filed March 27, 1944
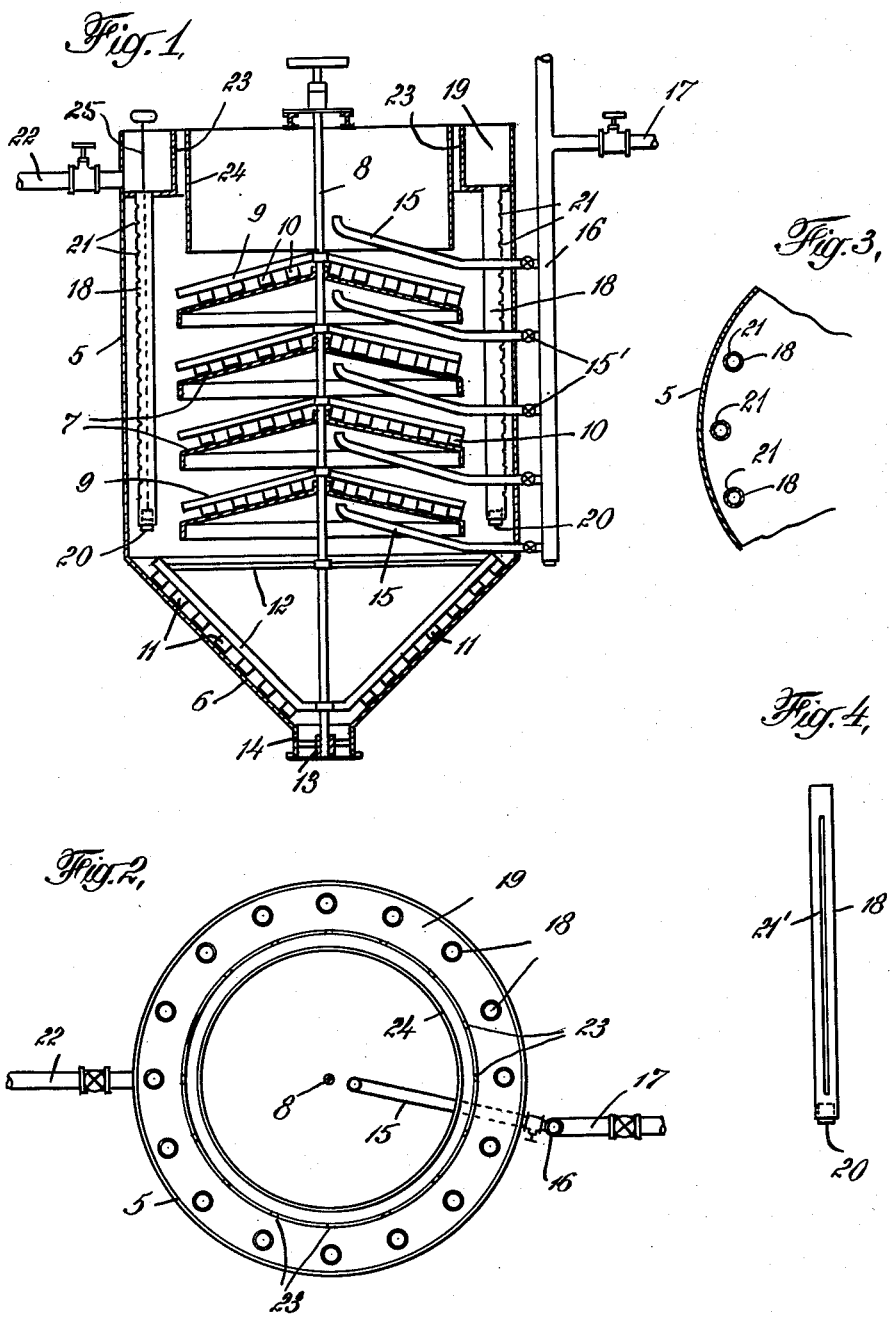
INVENTOR
Niels B. Bach
BY
Pennie, Davies, Marvin + Edmonds
ATTORNEYS Patented Apr. 12, 1949

2,467,003

UNITED STATES PATENT OFFICE 2,467,003

CLARIFIER

Niels B. Bach, New York, N. Y., assignor to The Mirrlees Watson Company Limited, Glasgow, Scotland, a British company Application March 27, 1944, Serial No. 528,241

2 Claims. (Cl. 210—55)

This invention relates to the clarification by sedimentation of liquids containing suspended solids, and has for its object the provision of certain improvements in the method of and apparatus for such clarification. More particularly, the invention contemplates certain improvements in the introduction of the liquid to be clarified into the body of liquid undergoing clarification, as a result of which clarification is facilitated and expedited.

Liquids containing finely divided suspended solids are commonly clarified by sedimentation in the course of which supernatant clarified liquid is withdrawn from the top and settled solids are withdrawn from the bottom of the body of liquid undergoing clarification. The operation is carried out in settling tanks or clarifiers, usually cylindrical, operated continuously or intermittently. It has heretofore been the general practice to introduce or feed the liquid to be clarified near the center of the tank and somewhat below the liquid level in the tank. I have discovered that a pronounced improvement in clarification is brought about by introducing the liquid to be clarified at a plurality of points approximate the periphery of the tank and over a substantial depth of the body of liquid undergoing clarification.

Based on the foregoing discovery, my present invention involves, in its broad aspect, introducing the liquid to be clarified into the body of liquid undergoing clarification by sedimentation at a multiplicity of peripherally or circumferentially spaced positions and in the form of a vertical series of fine streams extending as a whole over a substantial depth of the body of liquid. Such introduction of the liquid feed is readily effected by providing a multiplicity of depending and appropriately orificed feed or inlet pipes approximate the periphery of the receptacle in which the liquid is confined, such as a settling tank, clarifier, or the like. The pipes depend downwardly through a substantial depth of the receptacle, preferably through the greater part of the depth of the body of liquid undergoing sedimentation. The pipes communicate at their upper ends with the supply of liquid feed, such as a circumferential launder, are closed at their lower ends, and have discharge orifices throughout the greater part of their length directed generally toward the periphery of the receptacle. The discharge orifices may take the form of uniformly spaced small holes or perforations or one or more narrow slots. Preferably, a multiplicity of uniformly spaced inlet pipes is provided around the entire periphery of the receptacle.

The foregoing and other novel features of the invention will be best understood from the following description taken in conjunction with the accompanying drawing, in which Fig. 1 is a sectional elevation of a tray clarifier equipped with the invention, Fig. 2 is a top plan of the clarifier of Fig. 1, Fig. 3 is a detail plan of one arrangement of the feed pipes of the invention, and Fig. 4 is an elevation of a feed pipe with a slotted orifice.

While the principle of the invention may be advantageously applied to any type of continuous or intermittent settling tank or clarifier, its application to the continuous clarifier in common use in the sugar industry is especially advantageous; and hence the invention is herein more particularly described in connection with that type of clarifier. That clarifier comprises generally a cylindrical tank 5 with a conical base 6, a series of appropriately supported superposed and vertically spaced trays or settling surfaces 7, a central rotatable shaft 8 to which are secured radial arms 9 carrying plows (scrapers or chains) 10 immediately above the trays 7 for working solids settling on the trays towards the peripheral edge of the trays and into the annular vertical channel formed between the peripheral edges of the trays and the surrounding tank 5. Similar plows, scrapers or chains 11, carried by radial arms 12 secured to the shaft 8, prevent any accumulation of settled solids on the inclined surface of the base 6. The shaft 8 is suitably supported from the top of the tank and its lower end extends into a guide bearing 13 mounted in the solids discharge outlet 14 of the base 6. The shaft is appropriately driven by any suitable source of power, such as an electric motor, not shown. In a tray clarifier, suitably clarified liquid is withdrawn from the tank at levels immediately below each tray 7, and also somewhat above the top tray, by pipes 15. For the sake of simplicity, these pipes are shown in the drawing as communicating with a common vertical discharge pipe 16 having near its upper end a valved lateral outlet 17, but, as is well understood in the art, various arrangements may be used for appropriately controlling the withdrawal of clarified liquid from the pipes 15. In the clarifier illustrated in the drawing, each pipe 15 has a control valve 15' for regulating and controlling the supernatant liquid withdrawn through each pipe.

In accordance with the invention, a series of uniformly spaced inlet or feed pipes 18 are circumferentially arranged approximate the periphery of the tank 5. While these pipes may be supported in any suitable manner, they may advantageously be hung from and secured in corresponding holes in a circumferential feed launder 19 at the upper end of the tank 5. The pipes 18 depend through substantially the length or depth of the cylindrical wall of the tank 5, and are closed at their lower ends by plugs 20. Each pipe 18 has a vertically superposed series of uniformly and closely spaced discharge orifices 21 so arranged that the fine streams of fluid discharged through the orifices are directed horizontally toward the adjacent wall of the tank. The launder 19 is supplied with the liquid to be clarified through a valved supply pipe 22. To prevent overflow of the tank in the event that clogging of the orifices reduces the capacity of the feed pipes 18 to take care of the liquid supplied by the pipe 22 (as, for example, at night when the clarifiers may be left unattended), the inner wall of the launder 19 is provided with safety discharge orifices 23, somewhat below the top of the tank 5, which permit the supply feed to discharge into the annular space between the launder and a boot 24 depending a short distance within the tank.

In Fig. 1 of the drawing, the orifices 21 are shown as round holes positioned directly opposite the adjacent wall of the tank 5, so that the discharged streams of liquid impinge perpendicularly against the wall. In Fig. 3 of the drawing, the orifices 21 are shown so disposed that the discharged streams of liquid impinge obliquely against the wall, and in so doing induce a slow circumferential movement of the liquid approximate the wall. In Fig. 4 of the drawing, the discharge orifice 21' is in the form of a narrow vertical slot extending through the greater part of the length of the pipe. The single long slot may, if desired, be replaced by two or more shorter slots. If necessary to insure a uniform discharge of the supply feed over the entire length or depth of the discharge orifices (whether holes or slots), the orifices may be appropriately graduated in size from the top to the bottom.

The following specific example of the invention is included merely for illustrative purposes and is not to be understood as in any way restrictive of the scope and applicability of the invention: The clarifier was of the continuous tray type illustrated in the accompanying drawing, about 22 feet in diameter, with its cylindrical tank wall about 15–16 feet in depth. The feed pipes 18 were 3 inches in diameter, 9–10 feet in length, and provided with 34 circular discharge orifices approximately ½ inch (from ¼ to ¾ inch) in diameter uniformly spaced with about 3 inches between centers. There were 24 feed pipes uniformly spaced about the periphery of the tank with their longitudinal axes about 5 inches from the adjacent wall of the tank.

In practicing the invention in the apparatus illustrated in the drawing, the valved supply pipe 22, valved pipe 17 for withdrawing clarified liquid, and the solids or sludge discharge from the outlet 14 are adjusted and correlated, as is well understood in the art, to effect the contemplated continuous sedimentation and clarification throughout the depth of the tank. The supply feed is introduced into the tank through the discharge orifices of the depending pipes 18 over a substantial depth of the tank. The discharge orifices direct the supply feed in relatively fine streams against the adjacent wall of the tank, and small particles of suspended solids, otherwise difficult to eliminate by sedimentation, upon striking the tank wall flocculate into sufficiently large flocs to immediately begin settling in the annular vertical channel between the peripherial edges of the trays and the surrounding tank wall. Such floc formation and rapid settling goes on throughout the annular channel, wherever the discharged streams of the supply feed impinge against the tank wall, so that, within practical limits, the greater the number of pipes 18 there are, the more effective is the result. A considerable part of the suspended solids are thus eliminated and started settling directly toward the conical base 6, and to this extent the amount of solids to be settled in the customary manner on the trays 9 is reduced. This facilitates and expedites the sedimentation on the trays, and increases the capacity of the clarifier.

In the clarification of sugar juices, it is customary to carry out the operation at a relatively high liquid temperature, frequently close to the boiling temperature. Nothwithstanding the fact that the tank wall is usually externally covered with insulating material to maintain the desired high temperature of the liquid in the clarifier, the wall of the tank will be considerably cooler than the main body of liquid in the tank. Hence the liquid in touch with or close to the tank wall will have a tendency, all around the periphery of the tank, to flow downwardly towards the conical base, thereby promoting rapid settling of suspended matter just entering the tank and forming flocs in the vicinity of the tank wall as hereinbefore explained. Moreover, the cooler wall of the tank lowers the temperature of solids impinging thereagainst and this further aids floc formation.

Flocculation and clarification of the supply feed entering the tank may be further promoted by arranging the discharge orifices of the depending pipes 18 to direct the streams of entering fluid angularly, rather than perpendicularly, toward the tank wall and thereby inducing a slow circular or circumferential movement of the liquid in the tank, particularly in the vicinity of the tank wall. Irrespective of its precise character, the discharge of the supply feed in a multiplicity of small streams against the tank wall and over a substantial depth of the tank sets up liquid currents of a generally swirling character all around the tank wall and over a large part of its depth. This action brings the particles of suspended solids into contact with one another under conditions favorable to floc formation, and in this manner a considerable part of the suspended solids in the supply feed is immediately flocculated and removed from the liquid before it enters the usual settling or sedimentation zone of the clarifier.

Depending upon the nature of the suspended solids, there will be more or less tendency for the discharge orifices of the depending feed pipes 18 to clog and thereby reduce the volume of feed supplied to the clarifier. Clogging of the discharge orifices can be readily reduced to a minimum by periodically cleaning the inside of the pipes 18 with a wire brush or the like. In Fig. 1 of the drawing, such a brush 25 is shown in the left hand pipe 18. All or any part of the pipes 18 may be permanently provided with such brushes and the operator will, from time to time, manipulate the brushes back and forth and thus keep the discharge orifices open.

I claim:

1. An apparatus for clarifying liquids containing suspended solids comprising a receptacle having an outlet near its top for supernatant liquid and an outlet near its bottom for settled solids; a multiplicity of uniformly spaced inlet pipes positioned within the receptacle approximate the periphery of said receptacle and depending downwardly through a substantial depth of the receptacle, said pipes being closed at their lower ends and having discharge orifices throughout substantially their length directed generally outwardly toward the periphery of said receptacle, a circumferential launder communicating with the upper end of each of said pipes, and means for supplying liquid to be clarified to said launder.

2. An apparatus for clarifying liquids containing suspended solids comprising a receptacle having an outlet near its top for supernatant liquid and an outlet near its bottom for settled solids, a multiplicity of uniformly spaced inlet pipes positioned approximate the periphery of said receptacle and depending downwardly through a substantial depth of the receptacle, said pipes having discharge orifices throughout substantially their length directed generally toward the periphery of said receptacle, a circumferential launder communicating with the upper end of each of said pipes, said launder having openings communicating with the interior of said receptacle at a level intermediate the top of the receptacle and the upper ends of said pipes, and means for supplying liquid to be clarified to said launder.

NIELS B. BACH.

REFERENCES CITED

The following references are of record in the file of this patent:

UNITED STATES PATENTS

| Number | Name | Date |
| --- | --- | --- |
| 1,135,997 | Dorr | Apr. 20, 1915 |
| 1,327,944 | Cosler | Jan. 13, 1920 |
| 1,336,553 | Darrow | Apr. 13, 1920 |
| 1,595,066 | Booth | Aug. 10, 1926 |
| 1,709,971 | Coe | Apr. 23, 1929 |
| 1,741,187 | Fuqua | Dec. 31, 1929 |
| 1,869,797 | Cleaver | Aug. 2, 1932 |
| 2,141,371 | Bach | Dec. 27, 1938 |
| 2,153,607 | Bach | Apr. 11, 1939 |
| 2,195,739 | Rolston | Apr. 2, 1940 |

FOREIGN PATENTS

| Number | Country | Date |
| --- | --- | --- |
| 16,743 | Great Britain | Dec. 20, 1884 |
| 199,795 | Switzerland | Nov. 16, 1938 |